United States Patent [19]

Parsons

[11] Patent Number: 5,070,765
[45] Date of Patent: Dec. 10, 1991

[54] TORQUE TRANSFER MECHANISM

[75] Inventor: Bryan N. V. Parsons, Stoney Stanton, England

[73] Assignee: Jaguar Cars Limited, England

[21] Appl. No.: 629,219

[22] Filed: Dec. 18, 1990

[30] Foreign Application Priority Data

Dec. 22, 1989 [GB] United Kingdom ............... 8929128

[51] Int. Cl.$^5$ .......................... F01B 3/00; F04B 1/12; F04B 27/08; F16D 3/48
[52] U.S. Cl. ......................................... 92/71; 91/499; 417/269; 464/137; 74/60
[58] Field of Search ............... 464/106, 137, 138, 141, 464/143, 185; 92/12.2, 71; 91/499; 417/269

[56] References Cited

U.S. PATENT DOCUMENTS

| | | | |
|---|---|---|---|
| 4,172,368 | 10/1979 | Sjogren | 464/137 |
| 4,208,889 | 6/1980 | Peterson | 464/138 |
| 4,439,168 | 3/1984 | Orain | 464/137 |

FOREIGN PATENT DOCUMENTS

| | | | |
|---|---|---|---|
| 0962101 | 6/1950 | France | 464/138 |
| 1444805 | 8/1976 | United Kingdom | 92/71 |

*Primary Examiner*—Edward K. Look
*Assistant Examiner*—Thomas Denion
*Attorney, Agent, or Firm*—Davis, Bujold & Streck

[57] ABSTRACT

A mechanism for transmitting torque from one shaft to another shaft includes a formation attached to one shaft, the formation defining a plurality of cylindrical surfaces each having radius R, the axes of the cylindrical surfaces being parallel and disposed at angularly spaced locations about a circle of radius M, each cylindrical surface is engaged by a cylindrical bearing formation attached to the other shaft, each bearing formation having a radius r and being disposed in similar angular relationship to the cylindrical surfaces about a circle of axis inclined at angle to the axes of the cylindrical surfaces, the radius of the circle upon which the bearing formations are disposed being equal to $M/(1+\cos)$ and the radius R of the cylindrical surfaces being equal to $r + M(1-\cos)/(1+\cos)$.

18 Claims, 3 Drawing Sheets

TORQUE TRANSFER MECHANISM

BACKGROUND OF THE INVENTION

The present invention relates to a mechanism for transmitting torque from one component to another and in particular for transmitting torque between components with inclined axes.

This mechanism may be used to transmit rotational motion from one component to another, the axes of rotation of the components being inclined with respect to one another, without variation in angular velocity between the components.

Alternatively, the mechanism may be used to react torque, so that there is zero relative rotation between the components, that is the components are both stationary or rotate at the same angular velocity. A typical example of such use is in wobble or swash plate pumps or motors, where a series of pistons are connected to a plate which is mounted on a Z-crank, so that rotation of the crank will cause the plate to wobble and the pistons to reciprocate in associated cylinders, the mechanism according to the present invention ensuring that the plate does not rotate. Similarly in bent axis pumps and motors, the mechanism will ensure that the cylinders rotate at the same speed as the plate controlling reciprocating movement of the pistons.

SUMMARY OF THE INVENTION

According to one aspect of the present invention a mechanism for transmitting torque from one component to another comprises a formation associated with one component, said formation defining a plurality of plane cylindrical surfaces each having a radius R, the axes of said cylindrical surfaces being parallel and disposed at angularly spaced locations about a circle of radius M, each cylindrical surface being engaged by a cylindrical bearing formation associated with the other component, each bearing formation having a radius r and being disposed in similar angular relationship to the cylindrical surfaces about a circle of axis inclined at angle $\alpha$ to the axes of the cylindrical surfaces, the radius of the circle upon which the bearing formations are disposed being equal to $M/(1+\cos \alpha)$ and the radius R of the cylindrical surfaces being equal to $r + H(1-\cos \alpha)/(1+\cos \alpha)$.

With the above mechanism if one component is rotated, engagement of the cylindrical surface by the bearing formations will transmit rotation to the other component, the bearing formations sliding up and down and rolling around the cylindrical surfaces.

Alternatively, the above mechanism may be used to provide reciprocating motion, the components associated with the bearing formations being driven to provide a wobble motion, engagement between the bearing formations and cylindrical surfaces preventing relative rotation between the components.

BRIEF DESCRIPTION OF THE DRAWINGS

Various embodiments are now described, by way of example only, with reference to the accompanying drawings, in which.

DESCRIPTION OF A PREFERRED EMBODIMENT

Figure 1:
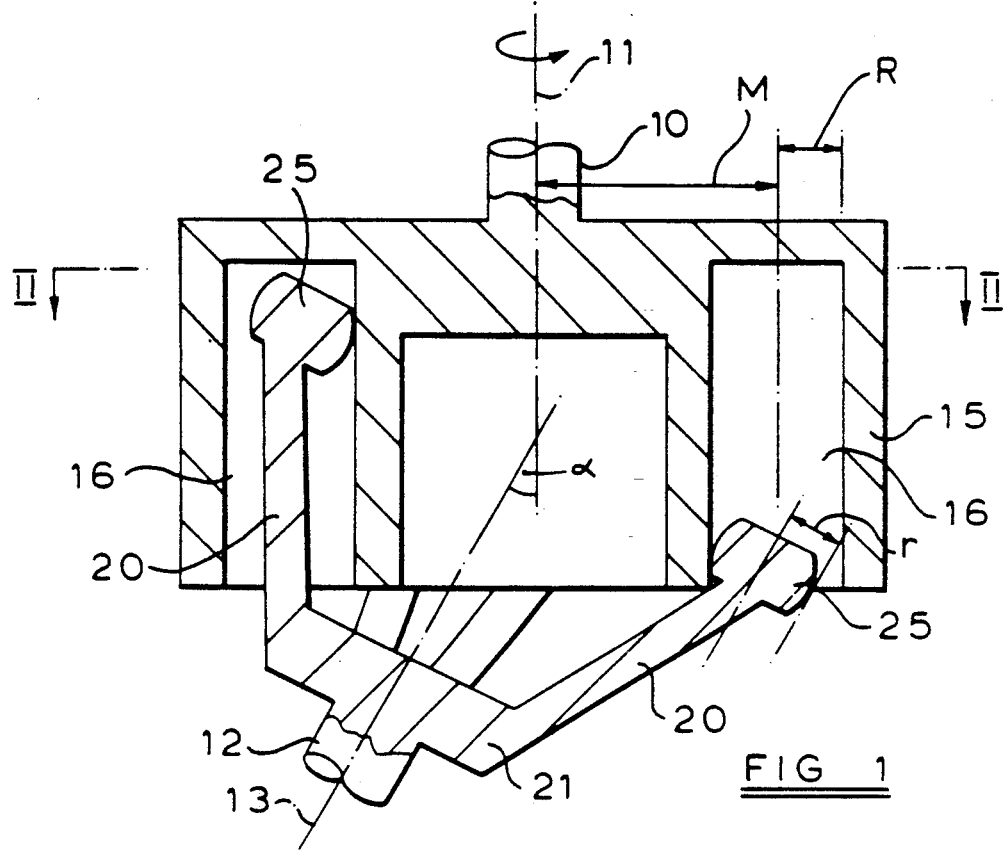
FIG. 1 illustrates diagramatically, a mechanism for transmitting rotation from one shaft to another.
Figure 2:
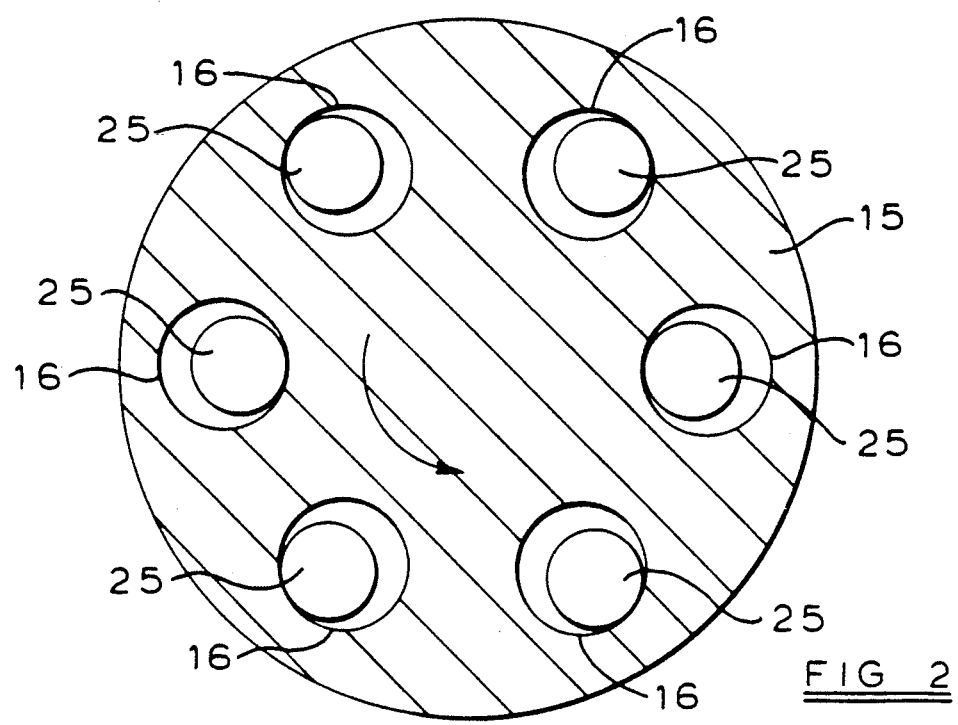
FIG. 2 is a diagramatic plan view of the mechanism illustrated in FIG. 1.

In the mechanism illustrated in FIGS. 1 and 2, the first shaft 10 is mounted for rotation about an axis 11 and a second shaft 12 is mounted for rotation about an axis 13, the axis 13 being inclined at an angle $\alpha$ to the axis 11.

A cylindrical formation 15 is attached to the end of shaft 10 and a series of axially extending cylinders 16 are provided in the formation 15, the cylinders 16 being located in equal angularly spaced relationship, with the axes of the cylinders 16 being equidistant from the axis 11.

A series of legs 20 disposed in the same angularly spaced relationship as cylinders 16, extend from a flange formation 21 on the end of shaft 12, each leg 20 extending into one of the cylinders 16. Each leg 20 is terminated in a part spherical bearing formation 25. The bearing formations 25 are disposed in a plane normal to the axis 13 and are equidistant from axis 13.

If:
M = the radius of the axes of cylinders 16;
R = the radius of the cylinders 16;
r = the radius of the bearing formations 25; and
$\alpha$ = the angle of inclination between the axes 11 and 13.

Then:

The radius of the axis of bearing formations 25 from axis 13 $= \dfrac{2M}{1 + \cos\alpha}$ and:

$$R = r + \frac{M(1 - \cos\alpha)}{(1 + \cos\alpha)}$$

As a result, each of the bearing formations 25 will engage the wall of the associated cylinder 16; at the innermost extremity of the wall of cylinder 16 when in their uppermost and lowermost positions (as illustrated in FIGS. 1 and 2); at the outermost extremities of the walls of cylinders 16 when at their mid-positions; and at intermediate positions inbetween. Consequently, if one of the shafts 10 and 12 is rotated, each bearing formation 25 is continuously in engagement with the wall of the associated cylinder 16, moving around the wall of the cylinder 16 while moving up and down the cylinder 16.

As a consequence of this engagement, upon rotation of one shaft 10 or 12 the other shaft 12 or 10 will be rotated at the same speed. Torque transfer between the bearing formations 25 and walls of cylinder 16 will vary with their angular disposition, falling to a minimum when the bearing formation 25 engages the innermost and outermost extremities of the walls of cylinder 16. Uniform torque transfer may however be achieved by having an appropriate number of pairs of cylinders 16 and bearing formations 25, so that at all times some bearing formations 25 will engage intermediate portions of the walls of cylinders 16.

Figure 3:
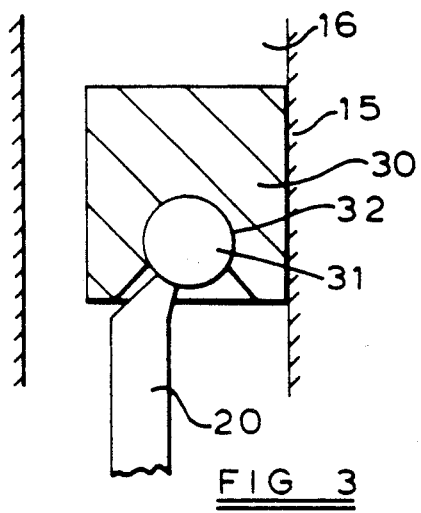
FIG. 3 illustrates a modification to the mechanism illustrated in FIGS. 1 and 2.

In the modification illustrated in FIG. 3, the part spherical bearing formations 25 are replaced by plane cylindrical bearing formations 30. These plane cylindrical bearing formations 30 are connected to the legs 20 by means of ball and socket pivot joints 31/32, thereby allowing the orientation of the bearing formation 30 to vary with respect to the leg 20, as the bearing formation 30 moves up and down the cylinder 16. The bearing formation 30 is thereby maintained in engagement with the wall of the cylinder 16. This arrangement will provide a significantly enlarged bearing area between the bearing formation 30 and the wall of cylinder 16, thereby increasing the torque transfer capacity and reducing wear of the bearing surfaces.

The mechanism according to the present invention utilises cylinders and produces a reciprocating motion in those cylinders. It is consequently extremely suitable for use in reciprocating piston devices and in particular wobble plate pumps or motors.

Figure 4:
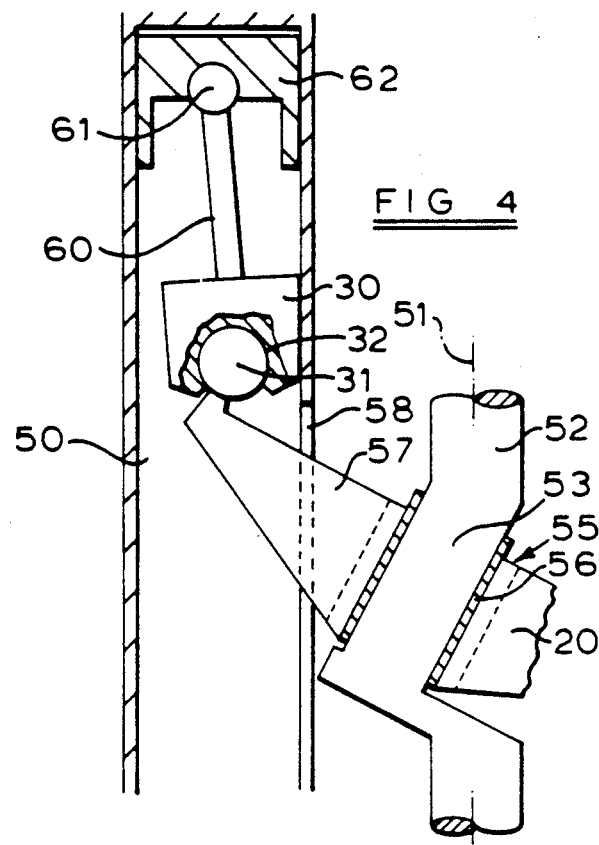
FIG. 4 illustrates one cylinder of a wobble plate pump with mechanism in accordance with the present invention.

In the wobble plate pump illustrated in FIG. 4, a series of cylinders 50 are disposed in equi-angular spaced relationship about a central axis 51, in similar manner to the cylinders 16 described above.

A drive shaft 52 is mounted centrally of the cylinders 50 for rotation about axis 51. A Z-crank 53 is provided on the shaft 52. A hub 55 is mounted on the Z-crank 53 for rotation with respect thereto, by means of a plane bearing 56.

A series of legs 57 extend radially from the hub 55 in the same angularly spaced relationship as the cylinders 50, each leg 57 extending through an axially extending slot 58 in the adjacent portion of the wall of one of the cylinders 50. The end of each leg 57 is connected by a ball and socket pivot joint 31/32, to a cylindrical bearing formation 30 of the form described with reference to FIG. 3.

The cylinders 50 are non-rotatably located, so that on rotation of shaft 52, engagement of the bearing formations 30 with the walls of the associated cylinders 50 will prevent the hub 55 from rotating. The hub 55 will consequently wobble as the shaft 52 is rotated, causing the bearing formations 30 to move up and down the cylinders 50.

The bearing formations 30 are each connected by connecting rod 60 and a pivot 61 to a piston 62 which is slidingly sealed within the associated cylinder 50. Reciprocating movement of the bearing formation 30 is consequently transferred to the piston 62, so that upon downward movement of the piston 62 fluid can be drawn into the cylinder 50 through an inlet port (not shown) and upon upward movement of the piston 62 the fluid can be expelled through an outlet port (not shown).

The connecting rod 60 may be of sufficient length such that at the bottom of its stroke, the piston 62 will remain above the slit 58 in the wall of piston 50. Alternatively, the slit 58 may be uncovered as the piston 62 moves down the cylinder 50 so that it may be used as an inlet port.

Figure 5:
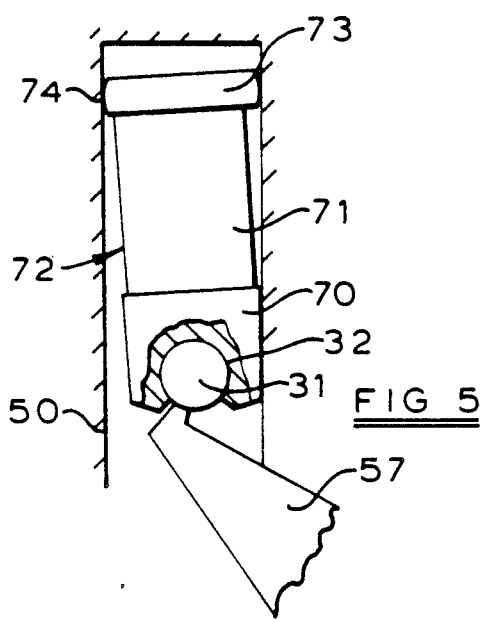
FIG. 5 illustrates a modification to the wobble plate pump illustrated in FIG. 4.

In the modification illustrated in FIG. 5, the bearing formation 70 is formed as an integral part of the skirt 71 of piston 72. As a result, the head 73 of the piston 72 will tilt as the piston 72 moves up and down the cylinder 50. The edge 74 of the head 73 of the piston 72 is consequently radiused in order to allow tilting. The edge 72 will also be provided with a piston ring of conventional design, in order to maintain a seal between the piston 72 and cylinder 50.

Figure 6:
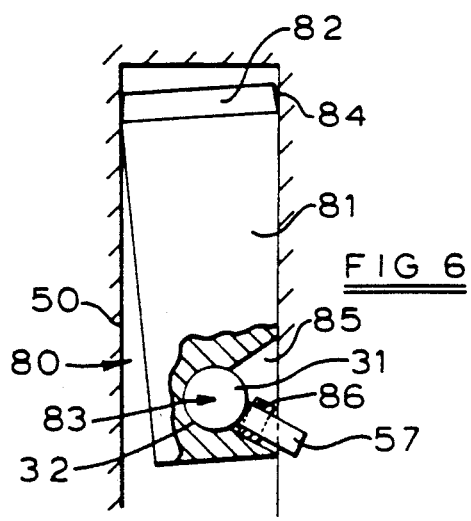
FIGS. 6 and 7 illustrate a further modification to the wobble plate pump illustrated in FIG. 4.
Figure 7:
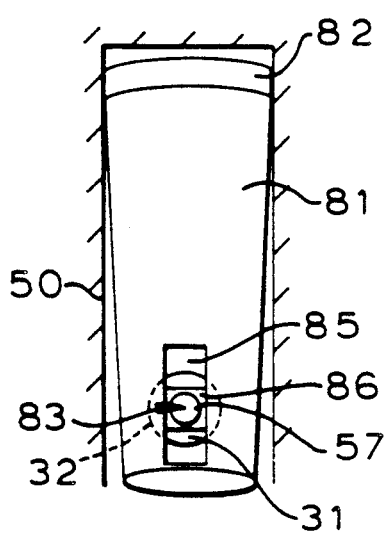

In the modification illustrated in FIGS. 6 and 7, the skirt 81 of the piston 80 is used as the bearing formation. In order to achieve this, the skirt 81 is tapered away from the piston head 82 so that at the pivot point 83 of the ball and socket pivot 31/32, the radius of the skirt 81 is the required function of the radius of the cylinder 50. In order to permit tilting of the piston 80 as it moves up and down cylinder 50, the edge 84 of the piston head 82 is inclined inwardly towards the upper face of the piston 80.

With this embodiment, the leg 57 is joined to the piston 80 by ball and socket pivot joint 30/31, from the side rather than below as with the previous embodiment. With such an arrangement, it is necessary to prevent the piston 80 rotating about its longitudinal axis. In order to achieve this, the leg 57 is of circular section and extends through a narrow elongate slot 85 in the piston 80. A square collar 86 is rotatably mounted on the leg 57 and engages the sides of the slot 85 to prevent rotation of the piston 80 about its longitudinal axis whilst permitting pivoting of the piston 80 about the ball and socket pivot joint 31/32 to accommodate movement of the piston 80 relative to the cylinder 50.

Figure 8:
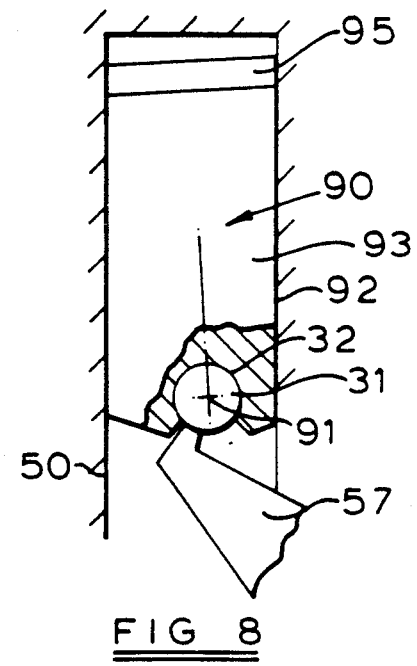
FIG. 8 illustrates an alternative modification to the wobble plate pump illustrated in FIG. 4.

In the embodiment illustrated in FIG. 8, the piston 90 engages the walls of the cylinder 50, along its full length. The leg 57 is connected to the piston 90 by ball and socket pivot joint 30/31 which is eccentric of the piston 90. The eccentricity of the pivot point 91 of the ball and socket joint 30/31 is equal to $$M(1-\cos\alpha)/(1+\cos\alpha)$$

so that the distance between pivot point 91 and portion 92 of skirt 93 of the piston 90 nearest thereto is equal to r the radius of the bearing surface.

With this embodiment, as the piston 90 moves up and down the cylinder 50, the piston 90 will rotate and portion 92 of the skirt 93 acts as the bearing formation. The head 95 of piston 90 is inclined so that the normal through its centre passes through pivot point 91 and the loads imposed thereon will be directed through the pivot point 91.

It will be appreciated that while the embodiments of the present invention illustrated in FIGS. 4 to 8, relate to a wobble plate pump, the invention is equally applicable to wobble plate internal combustion engines of similar configuration, in which detonation of a fuel/air mixture in the cylinders will cause the pistons to move up and down the cylinders, this movement being translated to rotational movement of an output shaft. The invention is also applicable to bent axis pumps and motors in which the pistons are driven in reciprocating manner by rotation of a member about one axis while the cylinders are driven about an inclined axis by a mechanism in accordance with the present invention.

Various modifications may be made without departing from the invention. For example, while in the embodiments described with reference to FIGS. 3 to 8, ball and socket joints are used to connect the legs with their associated bearing formations, other suitable universal joints which will provide the required pivotal movement may be used.

I claim:

1. A mechanism for transmitting torque from one component to another comprising a formation associated with one component, said formation defining a plurality of plane cylindrical surfaces each having a radius R, the axes of said cylindrical surfaces being parallel and disposed at angularly spaced locations about a circle of radius M, each cylindrical surface being engaged by a cylindrical bearing formation associated with the other component, each bearing formation having a radius r and being disposed in similar angular relationship to the cylindrical surfaces about a circle of axis inclined at angle $\alpha$ to the axes of the cylindrical surfaces, the radius of the circle upon which the bearing formations are disposed being equal to $M/(1+\cos\alpha)$ and the radius R of the cylindrical surfaces being equal to $r+M(1-\cos\alpha)/(1+\cos\alpha)$.

2. A mechanism according to claim 1 in which the bearing formations are of part-spherical configuration.

3. A mechanism according to claim 1 in which the bearing formations are of plane cylindrical configuration, each bearing formations being joined to its associated component by a universal pivot joint.

4. A mechanism according to claim 3 in which the bearing formation is connected to its associated component by a ball and socket pivot joint.

5. A mechanism according to claim 1 in which the formations on said one and said other component are mounted for rotation with said respective components.

6. A mechanism according to claim 1 in which the formation on said other component is rotatably mounted on a Z-crank, so that rotation of the Z-crank relative to the formation, will cause the formation to perform a wobble motion.

7. A mechanism as claimed in claim 1, wherein said mechanism is incorporated into a reciprocating piston device, the cylindrical surfaces being defined by closed cylinders with inlet and exhaust ports, pistons being slidably sealed in each of the cylinders and being interconnected with the bearing formation associated therewith, for movement with said bearing formation.

8. A mechanism according to claim 7 in which each piston is connected to its associated bearing formation by a connecting rod, the connecting rod being pivotally attached to the piston.

9. A mechanism according to claim 7 in which each bearing formation is formed integrally of a skirt portion of the associated piston.

10. A mechanism according to claim 9 in which each piston has a head portion, the edge of said head portion being radiussed to permit tilting of the piston in the associated cylinder.

11. A mechanism according to claim 7 in which each bearing formation is defined by a skirt portion of the associated piston, the skirt portion being tapered inwardly from a head portion, so that at the connection with the associated component, the skirt portion will be of the appropriate radius r.

12. A mechanism according to claim 11 in which the head portion of each piston is tapered inwardly from the skirt portion thereof, in order to permit tilting of the piston.

13. A mechanism according to claim 7 in which each bearing formation is connected to a radially extending leg defined by the associated component, by a universal pivot joint, access to the universal pivot joint being made from beneath the bearing formation.

14. A mechanism according to claim 7 in which each bearing formation is connected to a leg defined by the associated component by a universal pivot joint, access to the universal pivot joint being from the side of the bearing formation, means being provided to prevent rotation of the bearing formation axially of the cylinder.

15. A mechanism according to claim 14 in which each leg is of circular section and a square collar is rotatively mounted on each leg, the square collars engaging longitudinal sides of axially extending slots in the associated bearing formation.

16. A mechanism according to claim 7 in which each piston has a parallel sided skirt portion which engages the full circumference of the wall of the cylinder throughout its length, the associated component being attached to the piston, by a universal pivot joint, eccentrically of the axis of the piston, so that as the piston moves up and down the cylinder the piston will rotate to accommodate movement of the pivot point between the piston and its associated component.

17. A mechanism according to claim 16 in which each piston has a head formation inclined to the axis of the cylinder, the normal through the centre of the head formation passing through the pivot point of the universal pivot joint.

18. A mechanism according to claim 7 in which axial slots are provided in the wall of each cylinder to provide clearance for radially extending legs which form part of the component associated with the bearing formations, each bearing formation being connected to the end of the one of said legs.

* * * * *